US012689884B2

(12) United States Patent
Muñoz De La Torre Alonso et al.

(10) Patent No.: US 12,689,884 B2
(45) Date of Patent: Jul. 21, 2026

(54) USER EQUIPMENT DATA COLLECTION

(71) Applicant: Telefonaktiebolaget LM Ericsson (publ), Stockholm (SE)

(72) Inventors: Miguel Angel Muñoz De La Torre Alonso, Madrid (ES); Antonio Iniesta Gonzalez, Madrid (ES); Stefan Håkansson, Gothenburg (SE); Thorsten Lohmar, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 774 days.

(21) Appl. No.: 18/020,322

(22) PCT Filed: Jul. 21, 2021

(86) PCT No.: PCT/EP2021/070367
§ 371 (c)(1),
(2) Date: Feb. 8, 2023

(87) PCT Pub. No.: WO2022/033821
PCT Pub. Date: Feb. 17, 2022

(65) Prior Publication Data
US 2023/0336969 A1 Oct. 19, 2023

(30) Foreign Application Priority Data
Aug. 12, 2020 (EP) ..................................... 20382745

(51) Int. Cl.
*H04W 8/18* (2009.01)
*H04L 43/065* (2022.01)
*H04W 24/08* (2009.01)
(52) U.S. Cl.
CPC ............. *H04W 8/18* (2013.01); *H04L 43/065* (2013.01); *H04W 24/08* (2013.01)

(58) Field of Classification Search
CPC ........ H04W 8/18; H04W 24/08; H04L 43/065
See application file for complete search history.

(56) References Cited

U.S. PATENT DOCUMENTS

| | | | |
|---|---|---|---|
| 2020/0112907 A1* | 4/2020 | Dao .................. | H04M 15/8016 |
| 2023/0269608 A1* | 8/2023 | Puente Pestaña ..... | H04W 24/10 |
| | | | 370/252 |

OTHER PUBLICATIONS

Ericsson: "KI #8, New SOI: Providing UE Analytics to the NWSAF via the User Plane", 3GPP Draft; S2-2003695, 3rd Generation Partnership Project (3GPP), Mobile Competence Centre; 650 Route Des Lucioles; F-06921 Sophia-Antipolis Cedex; France, vol. SA 2G2, No. eMeeting; Jun. 1, 2020-Jun. 12, 2020 May 22, 2020 (Year: 2020).*

(Continued)

*Primary Examiner* — Myron Wyche
(74) *Attorney, Agent, or Firm* — Sage Patent Group

(57) ABSTRACT

A method for collecting user equipment (UE) data includes performing, at a network data analytics function (NWDAF), discovery of an application function (AF) for data collection. The discovery is based on the received request. The method subscribes to the AF for data collection at the NWDAF, and determines by the AF, one or more target UEs for data collection. The method performs discovery of a policy control function (PCF) by the AF, and sends a policy from the PCF to the one or more target UEs. The method establishes an association between at least one of the one or more target UEs and the AF, instructs the one or more target UEs to collect data and to send the collected data to the AF, and sends the collected data from the AF to the NWDAF.

16 Claims, 11 Drawing Sheets

(56)            References Cited

OTHER PUBLICATIONS

Qualcomm Incorporated: "User Plane Based UE Data Collection", 3GPP Draft; S2-2003863, 3rd Generation Partnership Project (3GPP), Mobile Competence Centre; 650 Route Des Lucioles; F-06921 Sophia-Antipolis Cedex; France, vol. SA WG2, No. Elbonia; Jun. 1, 2020-Jun. 12, 2020 May 22, 2020 (May 22, 2020), XP051889871 (Year: 2020).*

"3rd Generation Partnership Project" Technical Specification Group Core Network and Terminals; Study on CT WG3 Aspects of 5G Core Network and Terminals; Study on CT WG# Aspects of 5G System—Phase 1; Stage 3 (Release 15), 3GPP Standard Technical Report; 3GPP TR 29.890 (Year: 2017).*

International Search Report and Written Opinion of the International Searching Authority, PCT/EP2021/070367, mailed Oct. 8, 2021, 13 pages.

Ericsson, "KI #8, New Sol: Providing UE Analytics to the NWDAF via the User Plane," SA WG2 Meeting #139-e, S2-2003695, eMeeting, Jun. 1-12, 2020, 5 pages.

Qualcomm Incorporated, "User Plane Based UE Data Collection," SA WG2 Meeting #139E, S2-2003863, Elbonia, Jun. 1-12, 2020, 4 pages.

China Telecom et al., "Adding NWDAF as Nbsf_management service consumer," 3GPP TSG-CT WG3 Meeting #108-e, C3-201518, E-Meeting, Feb. 19-28, 2020, 4 pages.

3GPP TR 29.890 v1.1.0 (Nov. 2017); 3rd Generation Partnership Project; Technical Specification Group Core Network and Terminals; Study on CT WG3 Aspects of 5G System—Phase 1; Stage 3 (Release 15), 127 pages.

3GPP TR 23.700-91 v0.4.0 (Jun. 2020); 3rd Generation Partnership Project; Technical Specification Group Services and System Aspects; Study on enablers for network automation for the 5G System (5G); Phase 2 (Release 17), 186 pages.

* cited by examiner

Perform discovery of an application function 210

Subscribe to the application function 220

Determine target UE(s) for data collection 230

Perform discovery of a PCF 240

Send a policy to the target UE(s) 250

Establish association between target UE(s) and the AF 260

Instruct target UE(s) to collect and send data 270

Send collected data to the NWDAF 280

Communication system 400

| NWDAF 410 | AF 420 | PCF 430 |

Fig. 4

USER EQUIPMENT DATA COLLECTION

CROSS REFERENCE TO RELATED APPLICATIONS

This application is a 35 U.S.C. § 371 national stage application of PCT International Application No. PCT/EP2021/070367 filed on Jul. 21, 2021, which in turn claims foreign priority to European Patent Application No. 20382745.6 filed on Aug. 12, 2020, the disclosures and content of which are incorporated by reference herein in their entirety.

TECHNICAL FIELD

The present disclosure relates to the field of collecting user equipment (UE) data, specifically methods, communication systems, and apparatuses for the collection of UE data.

BACKGROUND

The 3GPP 5GC architecture for policy, charging, and analytics is illustrated in FIG. 1. The architecture is specified in 3GPP TS 23.501 and 3GPP TS 23.503. Relevant architectural aspects for the present disclosure include: NWDAF (Network Data Analytics Function), AF (Application Function), NEF (Network Exposure Function), PCF (Policy Control Function) and AMF (Access and Mobility Management Function).

The NWDAF represents an operator managed network analytics logical function. The Network Data Analytics Function (NWDAF) is a part of the architecture specified in TS 23.501 and uses the mechanisms and interfaces specified for 5GC and Operations Administration and Maintenance (OAM).

The NWDAF interacts with different entities for different purposes:

Data collection based on event subscription, provided by Access and Mobility Management Function (AMF), Session Management Function (SMF), Policy Control Function (PCF), Unified Data Management (UDM), Application Function (AF) (directly or via Network Exposure Function (NEF)), and OAM;

Retrieval of information from data repositories (e.g. User Data Repository (UDR) via UDM for subscriber-related information);

Retrieval of information about Network Functions (NFs) (e.g. Network Repository Function (NRF) for NF-related information, and Network Slice Selection Function (NSSF) for slice-related information); and On demand provision of analytics to consumers.

The Application Function (AF) interacts with the 3GPP Core Network to exchange information with the network operator.

The Network Exposure Function (NEF) supports different functionality and acts as the entry point into operator's network, so an external AF interacts with the 3GPP Core Network through NEF.

The Policy Control Function (PCF) supports a unified policy framework to govern the network behaviour. The PCF provides UE Policies to the UE through the AMF.

The Access and Mobility Management Function (AMF) manages UE access (e.g. when UE is connected through different access networks) and UE mobility aspects. The AMF is used to forward UE Policies from the PCF to the UE.

3GPP TR 23.700-91 is a Rel17 study related to enhancements for analytics and Network Data Analytics Function (NWDAF). Specifically, there is a Key Issue #8 "UE data as an input for analytics generation" regarding how to support the collection and utilisation of data provided by UEs in NWDAF in order to provide input information to generate analytics information, which is then to be consumed by other Network Functions (NFs).

The existing solutions in 3GPP TR 23.700-91 related to Key Issue #8 "UE data as an input for analytics generation", particularly solution #27, have the problems of only addressing the collection of UE data at Application Layer, but not other UE data (e.g. UE data related to UE's cellular radio conditions or UE data related to UE's context or state). A further problematic aspect is that they do not cover how the UE is instructed to establish a connection with the MNO AF.

SUMMARY

The solution disclosed herein aims to enable data collection from a UE to a NWDAF for analytics purposes, using an AF entity as intermediary between the UE and the NWDAF.

One aspect of the present disclosure provides a method for collecting user equipment, (UE) data. The method comprises: performing, at a network data analytics function, (NWDAF) discovery of an application function (AF) for data collection; subscribing to the AF for data collection at the NWDAF; determining, by the AF for data collection, one or more target UEs for data collection; performing discovery of a policy control function, PCF, by the AF for data collection; sending a policy from the PCF to the one or more target UEs; establishing an association between at least one of the one or more target UEs and the AF for data collection; instructing the one or more target UEs to collect data and to send the collected data to the AF; and sending the collected data from the AF to the NWDAF.

Another aspect of the present disclosure provides a method for collecting user equipment (UE) data. The method comprises: determining, by a network data analytics function, NWDAF, one or more target UEs for data collection; performing discovery of a policy control function (PCF) by the NWDAF; sending a policy from the PCF to the one or more target UEs; establishing an association between at least one of the one or more target UEs and the NWDAF; and instructing the one or more target UEs to collect data and to send the collected data to the NWDAF.

Another aspect of the present disclosure provides a communication system configured to collect user equipment (UE) data, the communication system comprising a network data analytic function (NWDAF) and the communication system being configured to: perform discovery of an application function (AF) for data collection, wherein the AF for data collection is a part of the communication system; subscribe to the AF for data collection at the NWDAF; determine, by the AF for data collection, one or more target UEs for data collection; perform discovery of a policy control function (PCF) by the AF for data collection, wherein the PCF is a part of the communication system; send a policy from the PCF to the one or more target UEs; establish an association connection between at least one of the one or more target UEs and the AF for data collection; instruct the one or more target UEs to collect data and to send the collected data to the AF; and send the collected data from the AF to the NWDAF.

Another aspect of the present disclosure provides an apparatus comprising a processor coupled with a memory.

The apparatus is configured to: perform discovery of an application function (AF) for data collection; subscribe to the AF for data collection at a network data analytic function, NWDAF; determine, by the AF for data collection, one or more target UEs for data collection; perform discovery of a policy control function (PCF) by the AF for data collection; send a policy from the PCF to the one or more target UEs; establish an association between at least one of the one or more target UEs and the AF for data collection; instruct the one or more target UEs to collect data and to send the collected data to the AF; and send the collected data from the AF to the NWDAF.

Another aspect of the present disclosure provides a communication system configured to collect user equipment (UE) data, the communication system comprising a network data analytic function (NWDAF) and the communication system being configured to: determine, by the NWDAF, one or more target UEs for data collection; perform discovery of a policy control function, PCF, by the NWDAF, wherein the PCF is a part of the communication system; send a policy from the PCF to the one or more target UEs; establish an association between at least one of the one or more target UEs and the NWDAF; and instruct the one or more target UEs to collect data and to send the collected data to the NWDAF.

Another aspect of the present disclosure provides an apparatus comprising a processor coupled with a memory. The apparatus is configured to: determine, by a network data analytic function (NWDAF) one or more target UEs for data collection; perform discovery of a policy control function (PCF) by the NWDAF; send a policy from the PCF to the one or more target UEs; establish an association between at least one of the one or more target UEs and the NWDAF; and instruct the one or more target UEs to collect data and to send the collected data to the NWDAF.

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 4 illustrates a communication system configured to collect UE data according to an embodiment of the present disclosure;

DETAILED DESCRIPTION

Embodiments described herein relates to a solution for the collection of UE data other than Application Layer data through Application Function (AF), e.g. Mobile Network Operator (MNO) AF. The UE data may be related to the UE's cellular radio conditions (e.g. Reference Signal Receive Power (RSSP), Reference Signal Received Quality (RSRQ), Power headroom, etc.) or UE data related to the UE's context or state (e.g. location information positioning, UE battery level, etc.). Embodiments described herein can be understood as an extension of the technique discussed in Sol #27. Specifically, in at least some of the embodiments described herein, AF is provided and controlled by the MNO and communicates with the UE via a protocol over HTTPS on the user plane. The AF for UE data collection in turn exposes the collected data from the UE to the NWDAF via Naf_EventExposure mechanism.

Figure 1:
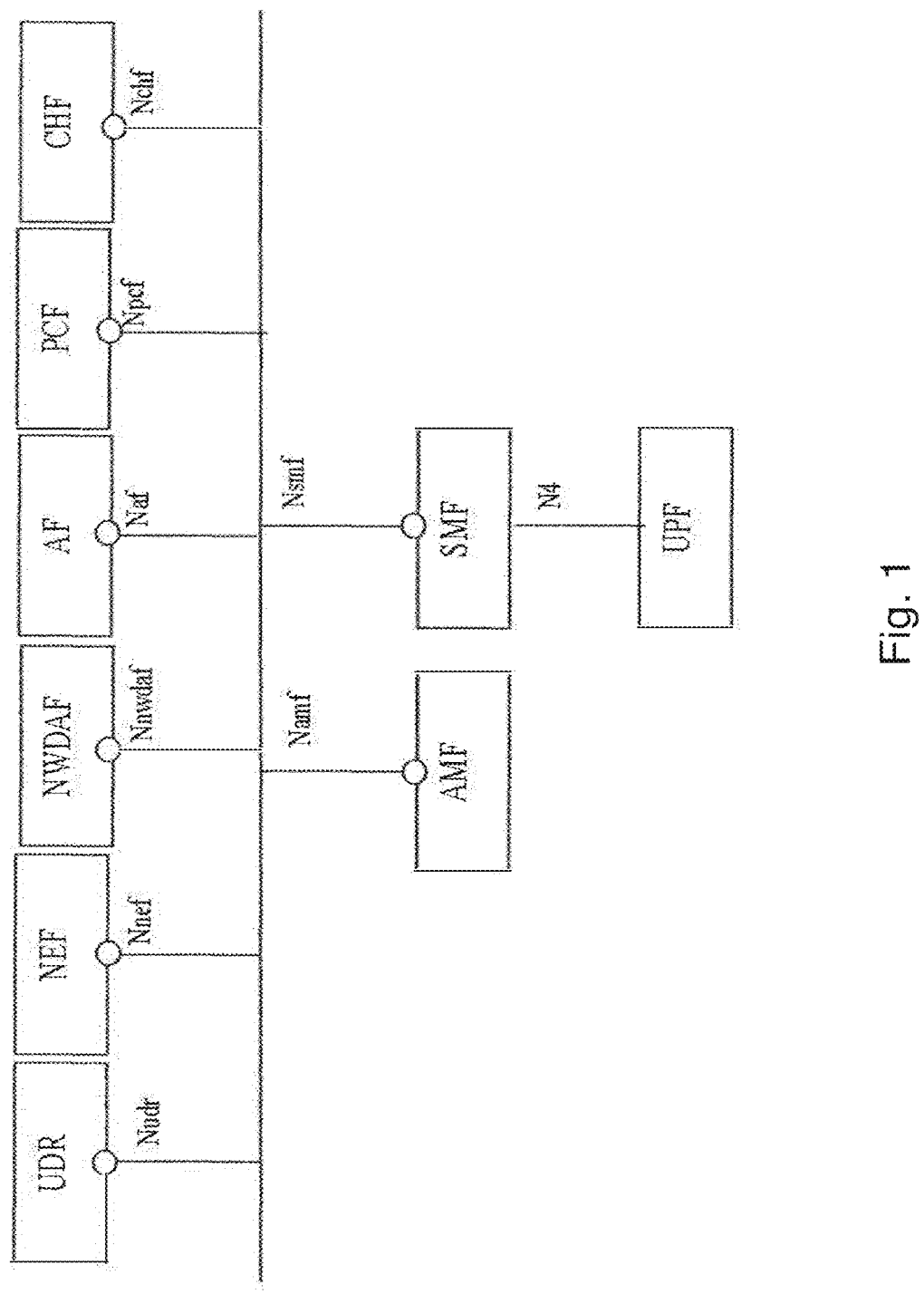
FIG. 1 illustrates the 3GPP 5GC architecture for policy, charging, and analytics.
Figure 2:
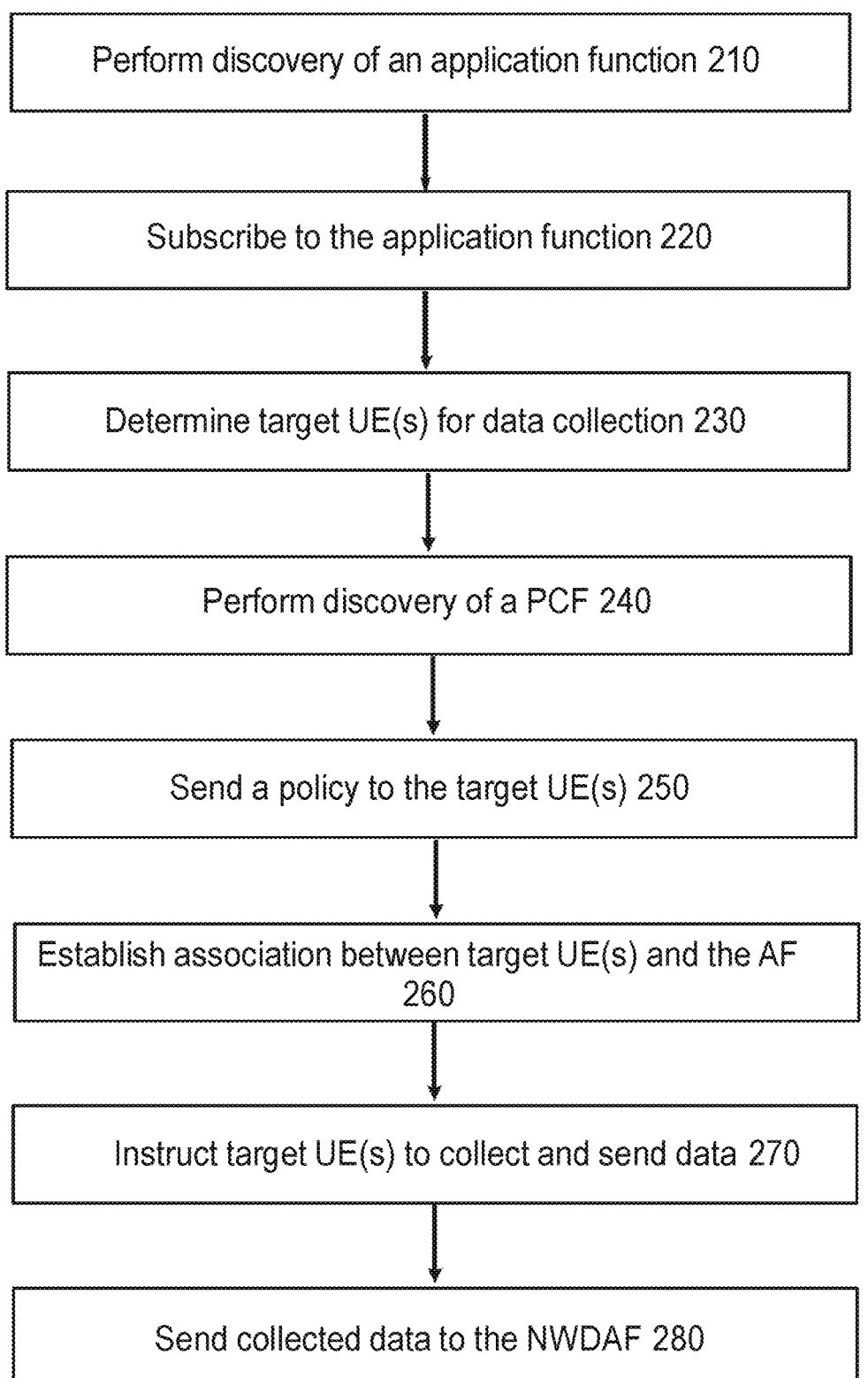
FIG. 2 a flow chart of a method for collecting UE data according to an embodiment of the present disclosure.

FIG. 2 is a flow chart of a method for collecting UE data according to an embodiment of the present disclosure. The method illustrated in FIG. 2 may be performed by an apparatus comprising a processor coupled with a memory.

With reference to FIG. 2, at a step 210, discovery of an application function (AF) for data collection is performed at a network data analytics function (NWDAF). In some embodiments the AF may be a mobile network operator (MNO) AF.

In some embodiments, the method may further comprise receiving a request for data analytics at the NWDAF. In these embodiments, the discovery operation at step 210 may be based on the received request for data analytics. The request for data analytics may be received from a consumer Network Function (NF), and the request for data analytics may comprise an analytic identifier and a UE identifier. The analytic identifier indicates the requested analytic, and the UE identifier indicates one or more target UEs.

Although not shown in FIG. 2, in some embodiments the method may further comprise the step of registering the AF in a Network Repository Function (NRF) by triggering a message including at least one of an indication of the network function (NF) type and a list of Event identifiers. In the present disclosure, an Event identifier indicates a supported event related to the collection of UE data. The registration may be performed prior to step 220. In these embodiments, the method may further comprise the step of providing an address of the AF to the NWDAF upon registration of the AF in the NRF. As will be explained in more detail in the following with reference to step 260, the address of the AF may be sent in the policy from the PCF to one or more target UEs.

Moreover, in these embodiments, the discovery of the AF for data collection at step 220 may be based on the indication of the NF and the list of Event identifiers contained in the message triggered by the registration of the AF.

Returning to FIG. 2, at step 220, the AF for data collection is subscribed at the NWDAF. Subscribing to the AF for data collection at step 220 may comprise sending a subscription request message to the AF for data collection. In this case, the subscription request message may comprise at least one of an Event identifier and a UE identifier. In the context of the present disclosure, the Event identifier indicates a supported event related to the collection of UE data and the UE identifier indicates one or more target UEs. The subscription request message may further comprise subscription information in some embodiments. The subscription information may comprise at least one of an event notification method, a maximum number of reports, a monitoring duration, a repetition period for periodic reporting, an immediate reporting indication, a sampling ratio, and a group reporting guard time.

Returning to FIG. 2, at step 230, one or more target UEs for data collection are determined by the AF for data collection.

In some embodiments, the method may further comprise the step of providing, by the NWDAF to the AF, at least one of a location criterion, a subscription permanent identifier (SUPI) group, and a SUPI list. In these embodiments, determining one or more target UEs for data collection by the AF at step 230 may be based on the received at least one of a location criterion, a SUPI group, and a SUPI list.

Returning to FIG. 2, at step 240, discovery of a policy control function (PCF) is performed by the AF for data collection.

Then at step 250, a policy is sent from the PCF to the one or more target UEs. The sending of the policy from the PCF to the one or more target UEs at step 250 may be based on a request from the AF.

The policy may include at least one of: an address of the AF, Protocol Data Unit (PDU) session characteristics to use for data reporting, and one or more conditions for data reporting. The address of the AF may be a Fully Qualified Domain Name (FQDN), a Uniform Resource Locator (URL), or an Internet Protocol (IP) address. The PDU session characteristics to use for data reporting may be indicative of at least one of a Single-Network Slice Selection Assistance Information (S-NSSAI) to use, a Data Network Name (DNN) to use, and a Session and Service Continuity (SCC) mode. The one or more conditions for data reporting may comprise at least one of a time criterion, a location criterion, a minimum threshold of UE battery level, a frequency range, and an identifier allowing the AF to authenticate a contacting entity.

In some embodiments, sending the policy from the PCF to the one or more target UEs at step 250 may be requested by the AF based on a Service Specific Information provisioning from the AF.

As mentioned above, in some embodiments the method may further comprise receiving a request for data analytics at the NWDAF. In these embodiments, the method may further comprise the step of storing the request for data analytics in a User Data Repository (UDR) to trigger a notification to the PCF. Also, in these embodiments, sending the policy from the PCF at step 250 may be triggered by the storage of the request in the UDR.

Returning to FIG. 2, at step 260, an association between at least one of the one or more target UEs and the AF for data collection is established. This association may be regarded as a connection in certain context of the present disclosure. The association may be established via Hypertext Transfer Protocol Secure (HTTPS), and the association may be established based on the policy sent from the PCF to the one or more target UEs in some embodiments. Moreover, in some embodiments, the association may be established between each of the one or more target UEs and the AF for data collection, so as to at least ensure the quality of the collected data from UE(s).

In some embodiments, establishing the association between at least one of the one or more target UEs and the AF for data collection at step 260 may comprise establishing a new Protocol Data Unit (PDU) session or reusing an existing PDU session. In embodiments where the establishing the association comprises reusing an existing PDU session, the existing PDU session may match the session characteristics to use for data reporting contained in the policy.

Returning to FIG. 2, at step 270, the one or more target UEs are instructed to collect data and to send the collected data to the AF for data collection. Specifically, in some embodiments, instructing the one or more target UEs at step 270 may be performed by the AF or the PCF.

As mentioned above with reference to step 220, in some embodiments subscribing to the AF for data collection may comprise sending a subscription request message to the AF for data collection. In these embodiments, instructing the one or more target UEs to collect data and to send the collected data at step 270 may comprise instructing the one or more target UEs to collect and/or send data according to the subscription information.

Returning to FIG. 2, at step 280, the collected data is sent from the AF to the NWDAF. The operation at step 280 may comprise triggering a notification towards the NWDAF, the notification comprising at least one of: an Event identifier, a UE identifier, and Event Data. In the context of the present disclosure, the Event identifier indicates an event related to the collection of UE data and the UE identifier indicates one or more target UEs.

Although not illustrated in FIG. 2, in some embodiments the method may further comprise producing, at the NWDAF, analytics based on the collected data, and sending the analytics to a consumer Network Function (NF), i.e. the consumer NF from which the request for data analytics is received.

Although the NWDAF and the AF are described above as separate entities performing separate functions, it will be appreciated that in some embodiments the NWDAF and the AF may be implemented in a single node and the functionalities of both the NWDAF and the AF described herein may be performed by said node.

Any appropriate steps, methods, or functions described above with reference to FIG. 2 may be performed through a computer program product. The computer program may include instructions which cause an apparatus (and any operatively coupled entities and devices) to execute methods according to embodiments described herein. The computer program and/or computer program product may thus provide means for performing any steps herein disclosed.

Figure 3:
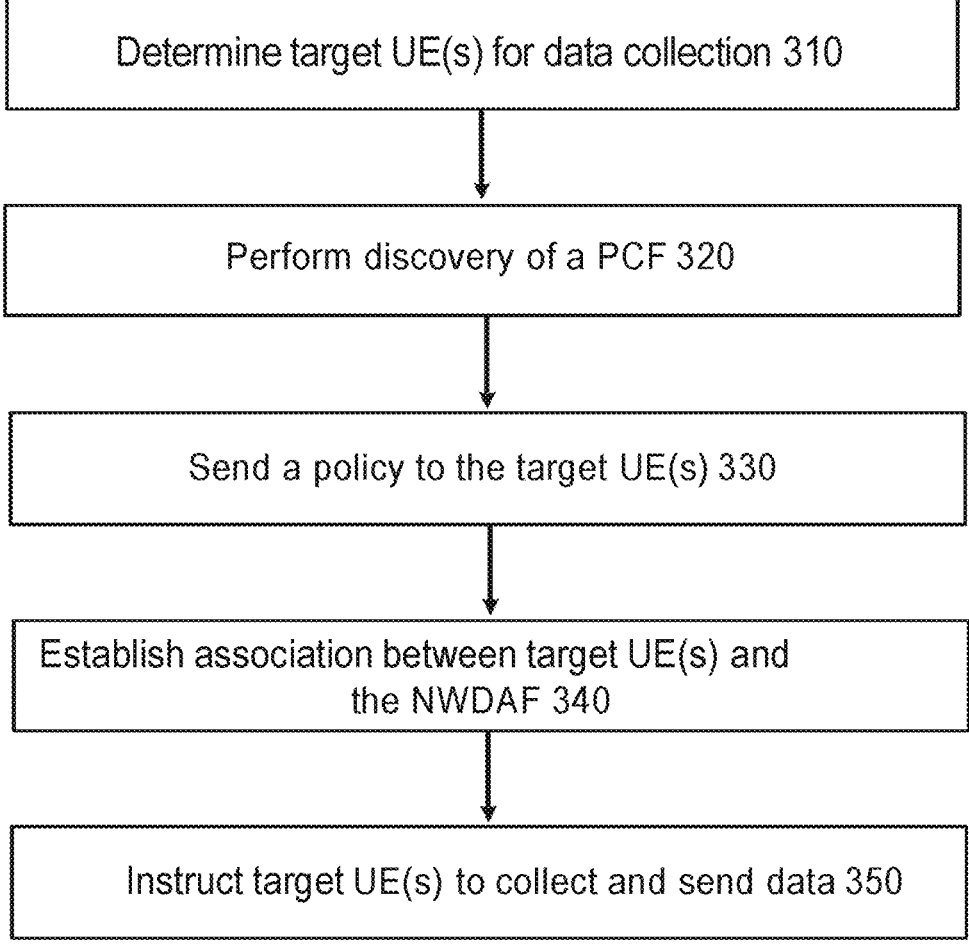
FIG. 3 is a flow chart of a method for collecting UE data according to an embodiment of the present disclosure.

FIG. 3 is a flow chart of a method for collecting UE data according to an embodiment of the present disclosure. The method illustrated in FIG. 3 may be performed by an apparatus comprising a processor coupled with a memory.

Returning to FIG. 3, at step 310, one or more target UEs for data collection are determined by a network data analytics function (NWDAF). The determination of the one or more target UEs for data collection by the NWDAF may be based on at least one of: a location criterion, a Subscription Permanent Identifier (SUPI) group, and a SUPI list. The at least one of: a location criterion, a SUPI group, and a SUPI list may be provided by at least the NWDAF itself and/or a consumer NF.

In some embodiments, the method may further comprise receiving a request for data analytics at the NWDAF. In these embodiments, the request for data analytics may be received from a consumer Network Function (NF), and it may comprise an analytic identifier and a UE identifier. In the context of the present disclosure, the analytic identifier indicates the requested analytic, and the UE identifier indicates one or more target UEs.

Returning to FIG. 3, at step 320, discovery of a policy control function (PCF) is performed by the NWDAF.

Then, at step 330, a policy is sent from the PCF to the one or more target UEs. Sending the policy from the PCF to the one or more target UEs at step 330 may be based on a request from the NWDAF. In some embodiments, the policy may include at least one of an address of the NWDAF, Protocol Data Unit (PDU) session characteristics to use for data reporting, and one or more conditions for data reporting. The address of the NWDAF may be a Fully Qualified Domain Name (FQDN), a Uniform Resource Locator (URL), or an Internet Protocol (IP) address. The PDU session characteristics to use for data reporting may be indicative of at least one of a Single-Network Slice Selection Assistance Information (S-NSSAI) to use, a Data Network Name (DNN) to use, and a Session and Service Continuity (SCC) mode. The one or more conditions for data reporting may comprise at least one of: a time criterion, a location criterion, a minimum threshold of UE battery level, a frequency range, and an identifier allowing the AF to authenticate a contacting entity.

In some embodiments, sending the policy from the PCF to the one or more target UEs at step 330 may be requested by the NWDAF based on a Service Specific Information provisioning from an application function (AF).

As mentioned above, in some embodiments the method may further comprise receiving a request for data analytics at the NWDAF. In these embodiments, the method may further comprise storing the request in a User Data Repository (UDR) to trigger a notification to the PCF. Also, in these embodiments, sending the policy from the PCF at step 330 may be triggered by the storage of the request in the UDR.

Returning to FIG. 3, at step 340, an association between at least one of the one or more target UEs and the NWDAF is established. This association may be regarded as a connection in certain context of the present disclosure. In some embodiments, the association may be established based on the policy sent from the PCF in step 330. Also, in some embodiments, the association may be established via Hypertext Transfer Protocol Secure (HTTPS) or an HTTPS cookie or access token. Moreover, in some embodiments, the association may be established between each of the one or more target UEs and the NWDAF, so as to at least ensure the quality of the collected data from UE(s).

Furthermore, in some embodiments establishing the association between at least one of the one or more target UEs and the NWDAF at step 340 may comprises establishing a new Protocol Data Unit (PDU) session or reusing an existing PDU session. In the case where an existing PDU session is reused, the existing PDU session may match the session characteristics to use for data reporting contained in the policy sent in step 330.

Returning to FIG. 3, at step 350, the one or more target UEs are instructed to collect data and to send the collected data to the NWDAF. In some embodiments, instructing the one or more target UEs to collect data and to send the collected data at step 350 may be performed by the NWDAF or the PCF.

Although not illustrated in FIG. 3, in some embodiments the method may further comprise requesting, by the NWDAF, specific UE data by indicating an Event identifier and additional reporting information. In these embodiments instructing the one or more target UEs to collect data and to send the collected data to the NWDAF at step 350 may be based on the request for specific UE data.

Although not illustrated in FIG. 3, in some embodiments the method may further comprise producing, at the NWDAF, analytics based on the collected data, and sending the analytics to a consumer Network Function (NF), i.e. the consumer NF from which the request for data analytics is received.

Although the NWDAF and the AF are described above as separate entities performing separate functions, it will be appreciated that in some embodiments the NWDAF and the AF may be implemented in a single node and the functionalities of both the NWDAF and the AF described herein may be performed by said node.

Any appropriate steps, methods, or functions described above with reference to FIG. 2 may be performed through a computer program product. The computer program may include instructions which cause an apparatus (and any operatively coupled entities and devices) to execute methods according to embodiments described herein. The computer program and/or computer program product may thus provide means for performing any steps herein disclosed.

Figure 4:
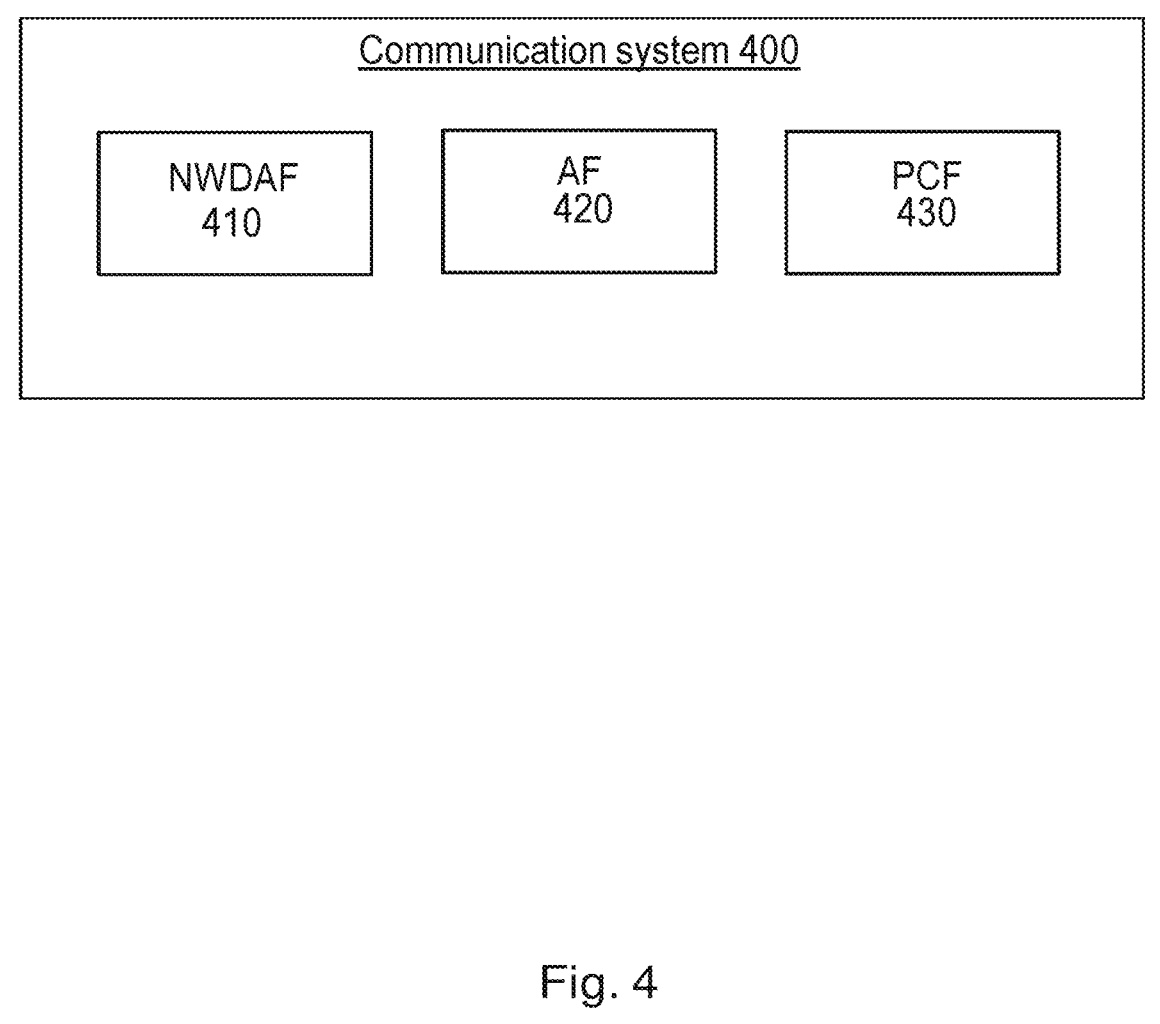

FIG. 4 illustrates a communication system configured to collect UE data according to an embodiment of the present disclosure. As shown in FIG. 4, the communication system 400 comprises a network data analytic function (NWDAF) 410, an application function (AF) 420, and a policy control function (PCF) 430. As will be explained in more detail below, the AF 420 and the PCF 430 are discovered by the communication system 400, both of which then subsequently becomes parts of the communication system 400 itself. In some embodiments, the NWDAF of the communication system 400 may be discovered by a consumer NF prior to the operations of the communication system 400 described herein.

The communication system 400 is configured to perform discovery of an AF for data collection, i.e. the AF shown in FIG. 4.

In some embodiments, the communication system 400 may be configured to receive a request for data analytics at the NWDAF 410. In these embodiments, the discovery of the AF for data collection may be based on the received request for data analytics. In some embodiments, the request for data analytics may be received from a consumer Network Function (NF). The request for data analytics may comprise at least one of: an analytic identifier and a UE identifier. The analytic identifier indicates the requested analytic, and the UE identifier indicates one or more target UEs. The AF may be a mobile network operator (MNO) AF.

Furthermore, the communication system 400 is configured to subscribe, at the NWDAF, the AF for data collection 420, and determine one or more target UEs for data collection by the AF for data collection 420.

Subsequently, the communication system 400 is configured to perform discovery of a PCF (i.e. the PCF 430) by the AF for data collection 420, to send a policy from the PCF 430 to the one or more target UEs, to establish an association between at least one of the one or more target UEs and the AF for data collection 420, to instruct the one or more target UEs to collect data and to send the collected data to the AF 420, and to send the collected data from the AF 420 to the NWDAF 410. The association between at least one of the one or more target UEs and the AF may be established via Hypertext Transfer Protocol Secure (HTTPS).

In some embodiments, the NWDAF 410 may be configured to produce analytics based on the collected data, and to sending the analytics to a consumer Network Function (NF), i.e. the consumer NF from which the request for data analytics is received.

In some embodiments, sending the policy from the PCF 430 to the one or more target UEs may be requested by the AF 420 based on a Service Specific Information provisioning from the AF 420.

As mentioned above, in some embodiments the communication system 400 may be configured to receive a request for data analytics at the NWDAF 410. In these embodiments, the communication system 400 may be further configured to store the request for data analytics in a User Data Repository (UDR) to trigger a notification to the PCF. In these embodiments, sending the policy from the PCF may be triggered by the storage of the request for data analytics in the UDR.

In some embodiments, PCF 430 may be configured to send the policy to the one or more target UEs based on a request from the AF 420. Alternatively or in addition, the policy may include at least one of an address of the AF, Protocol Data Unit (PDU) session characteristics to use for data reporting, and one or more conditions for data reporting. The address of the AF 420 may be a Fully Qualified Domain Name (FQDN), a Uniform Resource Locator (URL), or an Internet Protocol (IP) address. The PDU session characteristics to use for data reporting may be indicative of at least one of a Single-Network Slice Selection Assistance Information (S-NSSAI) to use, a Data Network Name (DNN) to use, and a Session and Service Continuity (SCC) mode. The one or more conditions for data reporting may comprise at least one of a time criterion, a location criterion, a minimum threshold of UE battery level, a frequency range, and an identifier allowing the AF 420 to authenticate a contacting entity.

In some embodiments, the communication system 400 may be configured to establish the association between at least one of the one or more target UEs and the AF based on the policy.

In some embodiments, the communication system 400 may be configured to establish the association between at least one of the one or more target UEs and the AF for data collection by establishing a new Protocol Data Unit (PDU) session or reusing an existing PDU session. In the case where the communication system 400 is configured to establish the association by reusing an existing PDU session, and the existing PDU session may match the session characteristics to use for data reporting contained in the policy.

In some embodiments, the NWDAF 410 may be configured to provide at least one of: a location criterion, a subscription permanent identifier (SUPI) group, and a SUPI list to the AF. In these embodiments, the AF 420 may be configured to determining one or more target UEs for data collection by the AF 420 is based on the received at least one of: a location criterion, a SUPI group, and a SUPI list.

In some embodiments, the communication system 400 may be configured to register the AF 420 in a Network Repository Function (NRF) by triggering a message including an indication of the network function (NF) type and a list of Event identifiers. In the context of the present disclosure, an Event identifier indicates a supported event related to the collection of UE data. Moreover, in these embodiments, the AF 420 may be configured to provide an address of the AF 420 to the NWDAF 410 upon registration of the AF 420 in the NRF. The discovery of the AF for data collection 420 in these embodiments may be based on the indication of the NF and the list of Event identifiers.

In some embodiments, the NWDAF 410 may be configured to subscribe to the AF for data collection 420 by sending a subscription request message to the AF for data collection 420. The subscription request message may comprise at least one of an Event identifier and a UE identifier. The Event identifier indicates a supported event related to the collection of UE data and the UE identifier indicates one or more target UEs. Furthermore, the subscription request message further may comprise subscription information, and the subscription information may comprise at least one of an event notification method, a maximum number of reports, a monitoring duration, a repetition period for periodic reporting, an immediate reporting indication, a sampling ratio, and a group reporting guard time. In addition, in these embodiments, instructing the one or more target UEs to collect data and to send the collected data may comprise instructing the one or more target UEs to collect and/or send data according to the subscription information.

In some embodiments, instructing the one or more target UEs to collect data and to send the collected data may be performed by the AF 420 or the PCF 430.

In some embodiments, the AF 420 may be configured to send the collected data to the NWDAF by triggering a notification towards the NWDAF. In these embodiments, the notification may comprise an Event identifier, a UE identifier, and Event Data. In the context of the present disclosure, the Event identifier indicates an event related to the collection of UE data and the UE identifier indicates one or more target UEs.

It will be appreciated that FIG. 4 only shows the components required to illustrate an aspect of the communication system 400 and, in a practical implementation, the communication system 400 may comprise alternative or additional components to those shown. For example, although the NWDAF and the AF are described above as separate entities performing separate functions, it will be appreciated that in some embodiments the NWDAF and the AF may be implemented in a single node and the functionalities of both the NWDAF and the AF described herein may be performed by said node.

Figure 5:
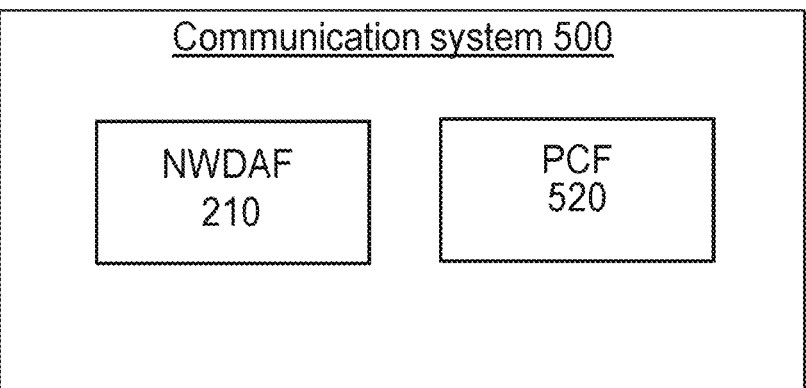
FIG. 5 illustrates a communication system configured to collect UE data according to an embodiment of the present disclosure.

FIG. 5 illustrates a communication system configured to collect UE data according to an embodiment of the present disclosure. As shown in FIG. 5, the communication system 500 comprises a network data analytic function (NWDAF) 510 and a policy control function (PCF) 520. As will be explained in more detail below, the PCF 520 is discovered by the communication system 500, which then subsequently becomes a part of the communication system 500 itself.

The communication system 500 is configured to determine, by the NWDAF 510, one or more target UEs for data collection.

In some embodiments, the communication system 500 may be configured to receive a request for data analytics at the NWDAF 510. In these embodiments, the determination of the one or more target UEs be based on the received request for data analytics. The request for data analytics may be received from a consumer Network Function (NF), and it may comprise at least one of an analytic identifier and a UE identifier. In the context of the present disclosure, the analytic identifier indicates the requested analytic, and the UE identifier indicates one or more target UEs.

In some embodiments, the NWDAF 510 may be configured to determine the one or more target UEs for data collection based on at least one of: a location criterion, a Subscription Permanent Identifier (SUPI) group, and a SUPI list.

Subsequently, the communication system 500 is configured to performing discovery of a PCF (i.e. the PCF 520) by the NWDAF 510, to send a policy from the PCF to the one or more target UEs, to establish an association between at least one of the one or more target UEs and the NWDAF, and to instruct the one or more target UEs to collect data and to send the collected data to the NWDAF.

In some embodiments, the policy may include at least one of: an address of the NWDAF, Protocol Data Unit (PDU) session characteristics to use for data reporting, and one or more conditions for data reporting. The address of the NWDAF may be a Fully Qualified Domain Name (FQDN), a Uniform Resource Locator (URL), or an Internet Protocol (IP) address. The PDU session characteristics to use for data reporting are indicative of at least one of: a Single-Network Slice Selection Assistance Information (S-NSSAI) to use, a Data Network Name (DNN) to use, and a Session and Service Continuity (SCC) mode. The one or more conditions for data reporting may comprise at least one of a time criterion, a location criterion, a minimum threshold of UE battery level, a frequency range, and an identifier allowing the AF to authenticate a contacting entity.

In some embodiments, the NWDAF 510 may be further configured to produce analytics based on the collected data, and to send the analytics to a consumer Network Function (NF), i.e. the consumer NF from which the request for data analytics is received.

In some embodiments, sending the policy from the PCF 520 to the one or more target UEs may be requested by the NWDAF 510 based on a Service Specific Information provisioning from an application function (AF) (which is not shown in FIG. 5).

As mentioned above, in some embodiments the communication system 500 may be configured to receive a request for data analytics at the NWDAF 510. In these embodiments, the communication system 500 may be further configured to store the request for data analytics in a User Data Repository (UDR) to trigger a notification to the PCF 520. In these embodiments, sending the policy from the PCF may be triggered by the storage of the request for data analytics in the UDR.

In some embodiments, the PCF 520 may be configured to send the policy to the one or more target UEs based on a request from the NWDAF 510.

In some embodiments, instructing the one or more target UEs to collect data and to send the collected data may be performed by the NWDAF 510 or the PCF 520.

In some embodiments, the communication system 500 may be configured to establish the association between at least one of the one or more target UEs and the NWDAF 510 by establishing a new Protocol Data Unit (PDU) session or reusing an existing PDU session. In the case the association is established by reusing an existing PDU session, the existing PDU session may match the session characteristics to use for data reporting contained in the policy.

In some embodiments, the NWDAF 510 may be configured to request specific UE data by indicating an Event identifier and additional reporting information. In these embodiments, instructing the one or more target UEs to collect data and to send the collected data to the NWDAF may be based on the request for specific UE data.

In some embodiments, the association between at least one of the one or more target UEs and the NWDAF may be established based on the policy. Alternatively or in addition, the association between at least one of the one or more target UEs and the NWDAF may be established via Hypertext Transfer Protocol Secure (HTTPS).

It will be appreciated that FIG. 5 only shows the components required to illustrate an aspect of the communication system 500 and, in a practical implementation, the communication system 500 may comprise alternative or additional components to those shown. For example, although the NWDAF and the AF are described above as separate entities performing separate functions, it will be appreciated that in some embodiments the NWDAF and the AF may be implemented in a single node and the functionalities of both the NWDAF and the AF described herein may be performed by said node.

Figure 6A:
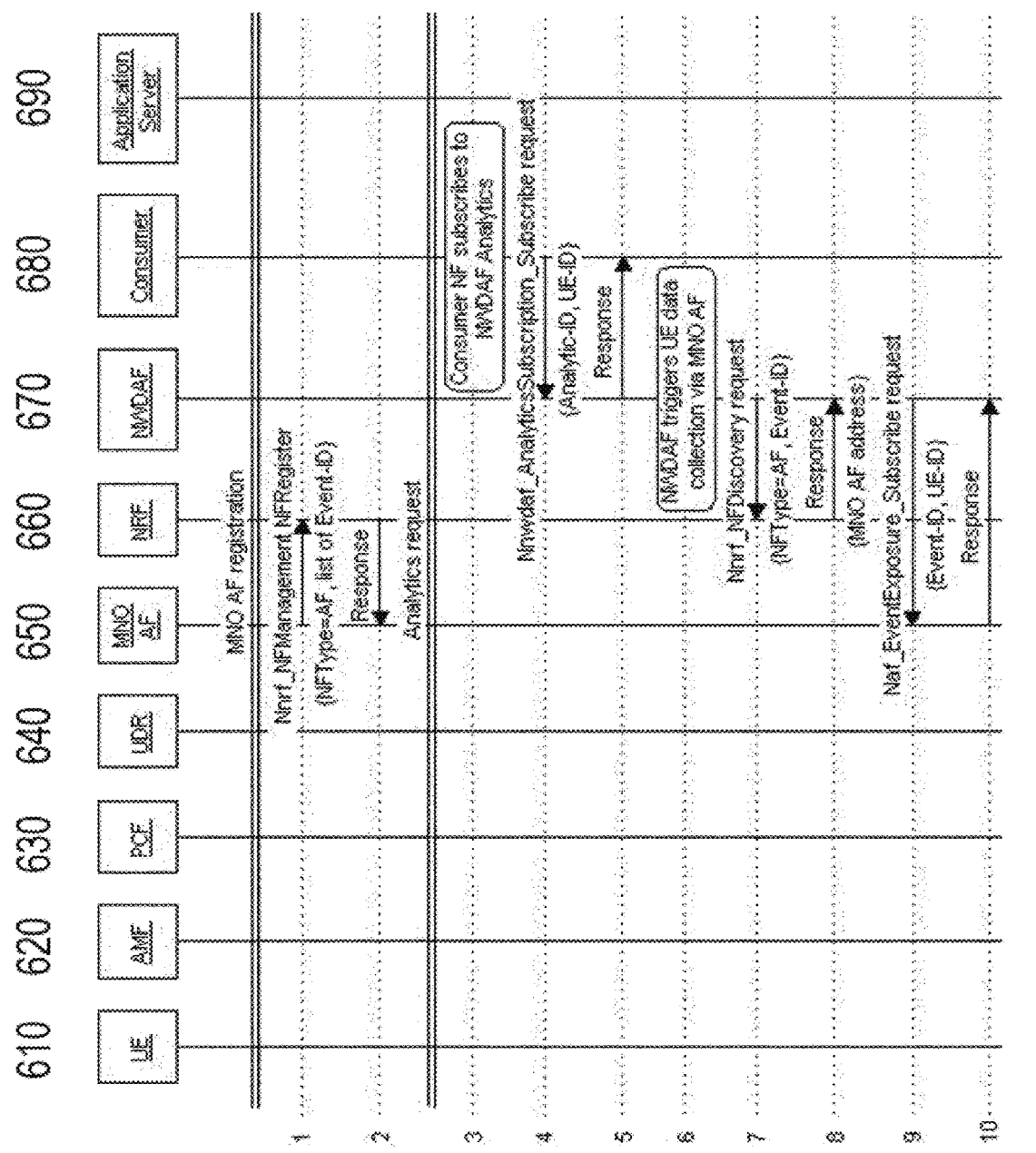
FIGS. 6A, 6B, 6C and 6D illustrate, in a sequence diagram, an example of a data collection procedure according to an embodiment of the present disclosure.

FIGS. 6A, 6B, 6C and 6D illustrate, in a sequence diagram, an example of a data collection procedure according to an embodiment of the present disclosure. Steps 1 to 15 of the exemplary procedure are illustrated in FIGS. 6A and

Figure 6B:
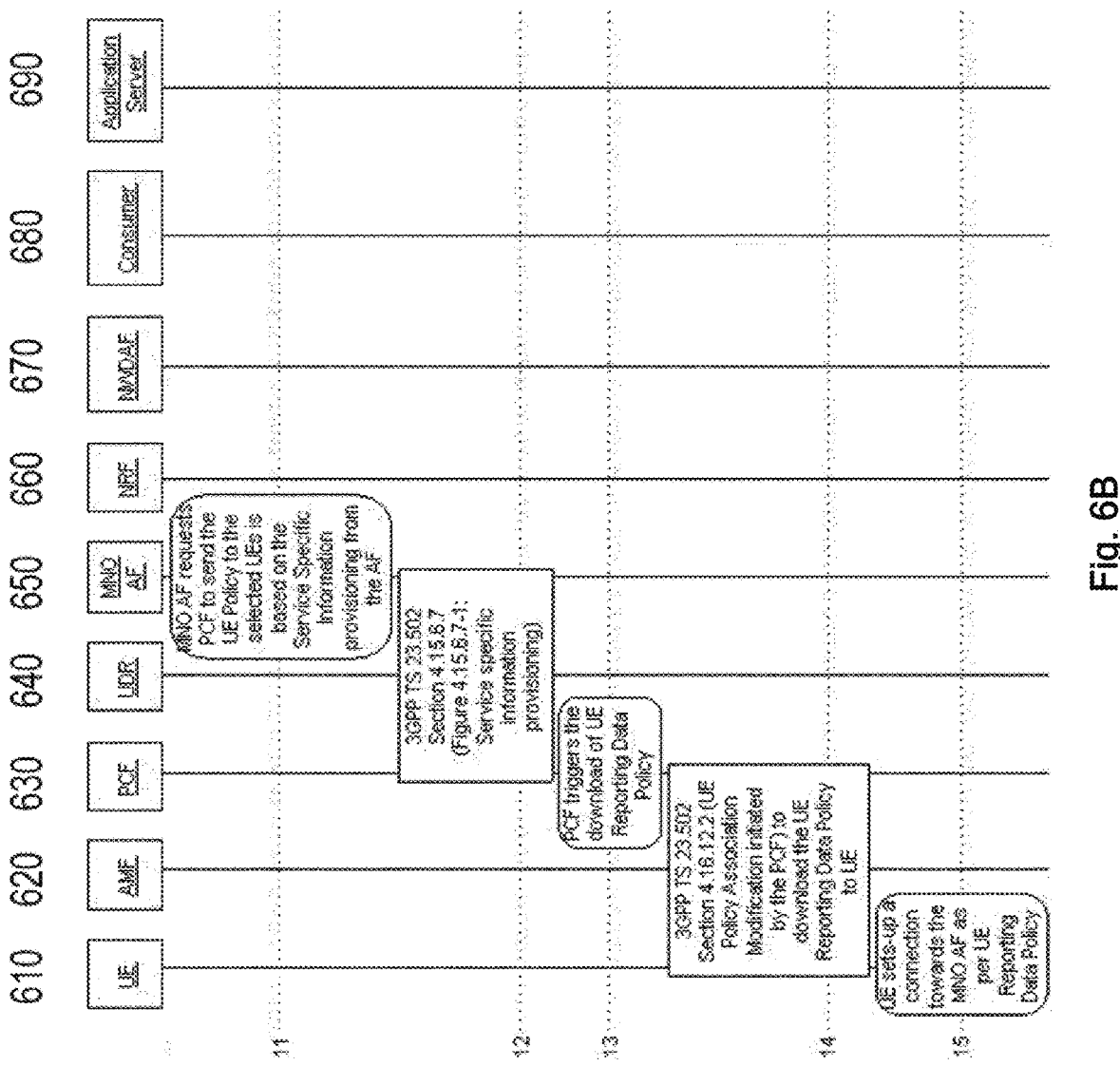
Figure 6C:
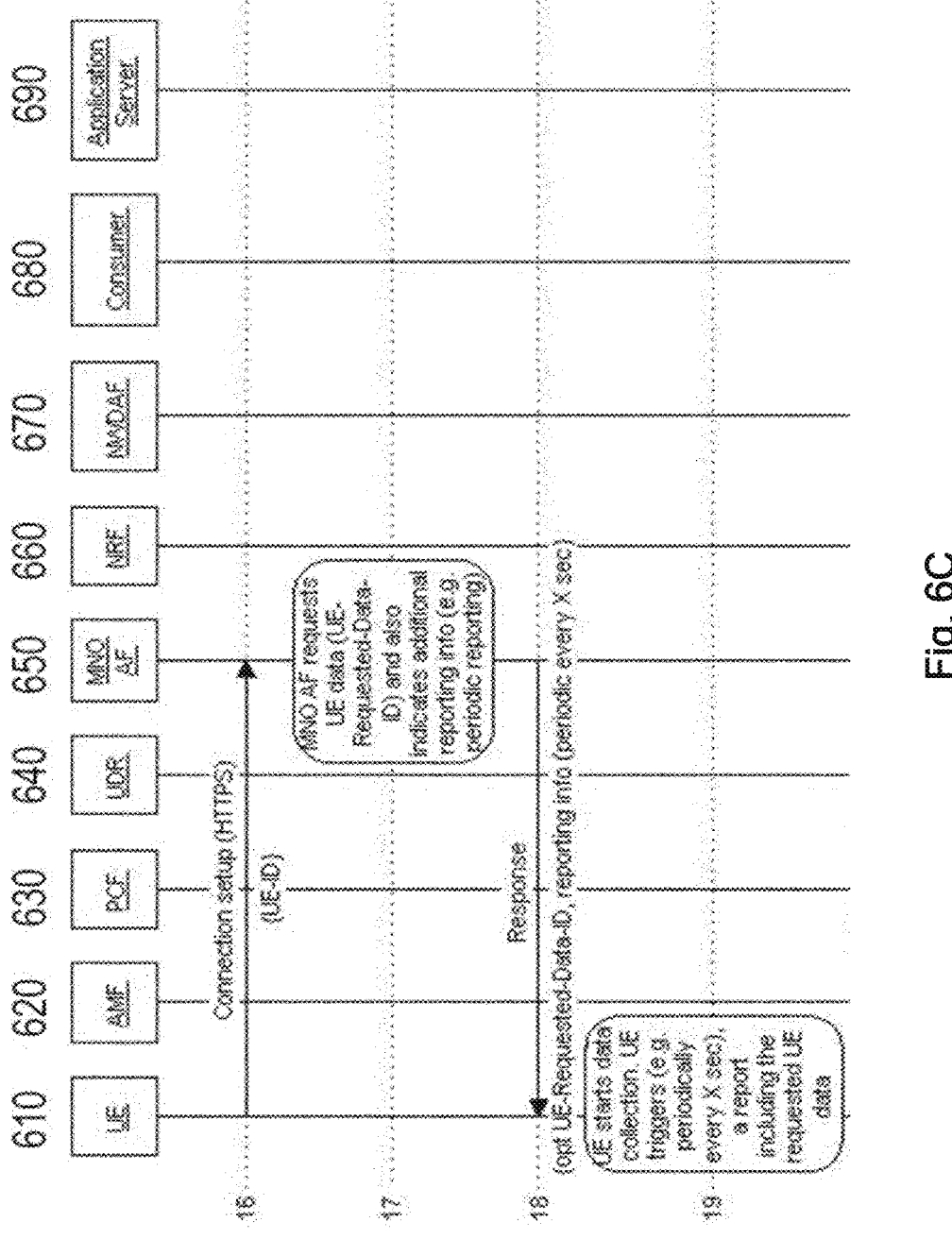
Figure 6D:
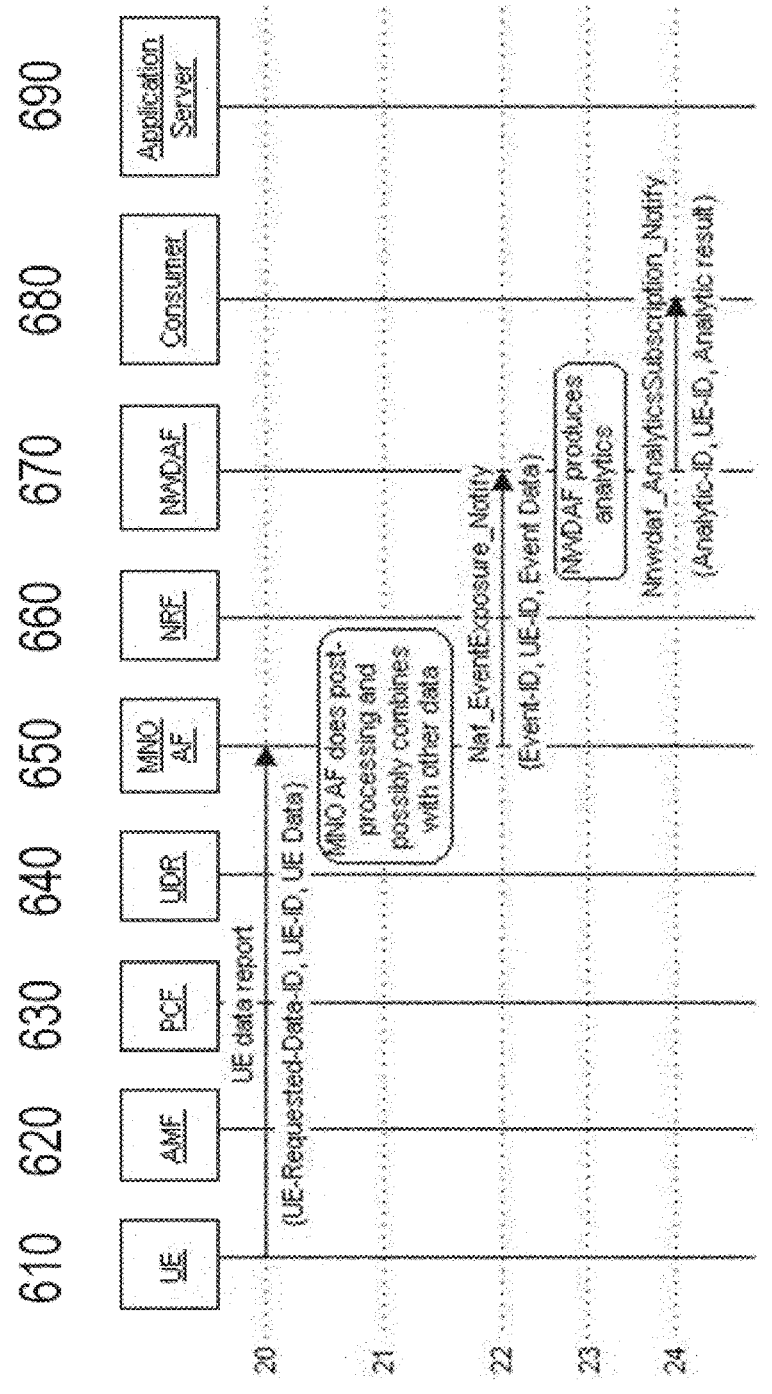

6B, while steps 16 to 24 of the exemplary procedure are illustrated in FIGS. 6C and 6D. In this example, it is assumed that the UE's Policy associations are already established.

In step 1 as shown in FIG. 6A, the MNO AF 650 (i.e. the AF for UE data collection) may register in the NRF 660 by triggering a Nnrf_NFManagement NFRegister message. The Nnrf_NFManagement NFRegister message may include the following parameters: NFType=AF and List of Event-ID, the latter indicating the supported events related to collection of UE data other than Application Layer data.

In this example, it is assumed there is a single MNO AF instance for the collection of UE data other than Application Layer data for all UEs. However, if that is not the case, in other embodiments the NWDAF 670 can distribute the target UEs among several MNO AFs.

Next, in step 2 as shown in FIG. 6A, the NRF 660 may acknowledge the request from step 1. In steps 3 and 4, the Consumer NF 680 may subscribe to the NWDAF Analytics and trigger a Nnwdaf_AnalyticsSubscription_Subscribe request message including the following parameters: Analytic-ID (which indicates the analytic requested) and UE-ID (which indicates the target UE). In this example, only one UE 610 is involved, but it will be appreciated that more than one UEs can be involved in other embodiments.

Next, in step 5 as shown in FIG. 6A, the NWDAF 670 may acknowledge the request from step 4. Then, at steps 6 and 7, the NWDAF 670 may trigger UE data collection via the MNO AF 650, as input data to generate the requested analytic. In the operation of steps 6 and 7, the NWDAF 670 may first need to discover the MNO AF 650 providing the UE requested data, so it triggers a Nnrf_NFDiscovery request message including the following parameters: NFType=AF and Event-ID (the latter indicating the target event related to collection of UE data other than Application Layer data).

In step 8 as shown in FIG. 6A, the NRF 660 may respond to the NWDAF 670 by providing the MNO AF address (which can be either a FQDN, URL, or IP address). Then, in step 9, the NWDAF 670 may trigger a Naf_EventExposure-_Subscribe request message towards MNO AF, including at least one of the following parameters: Event-ID (indicates the target event related to collection of UE data other than Application Layer data) and UE-ID (which indicates the target UE). The NWDAF 670 may optionally also provide subscription information to further control how data can be collected and provided by the MANO AF 650. The subscription information may include: eventsRepInfo (notifMethod, maxReportNbr, monDur, repPeriod, sampRatio (only for all UEs), grpRepTime). In step 10, the MNO AF 670 can then acknowledge the request message from step 9.

In steps 11 and 12 as shown in FIG. 6B, the MNO AF 670 may request the PCF 630 to send the UE Reporting Data Policy to the selected (target) UEs, based on the Service Specific Information provisioning from the AF 650. In some cases, the existing solution in 3GPP TS 23.502 Section 4.15.6.7 (Figure 4.15.6.7-1: Service specific information provisioning) can be used in this regard. In other words, the MNO AF 650 can request the PCF 630 to send the UE Policy to the selected UEs based on the Service Specific Information provisioning from the AF 650.

In the operation of steps 11 and 12 as shown in FIG. 6B, the MNO AF 650 can store a request in UDR 640 (in this case directly without using NEF), which in turn can trigger a Nudr notification to the subscribed PCFs, which can then trigger the sending of UE Policy for affected UE Policy associations. Alternatively, the MNO AF 650 can discover the PCF instance handling the UE Policy association and directly request the PCF 640 to send the UE Policy to the selected (target) UEs.

In steps 13 and 14 as shown in FIG. 63, the PCF 630 may trigger the download of (new) UE Reporting Data Policy which can then be sent as a UE policy through the AMF 620, following the standard procedure for UE policy update described in 3GPP TS23.502 section 4.16.12.2. An example of the structure of the new UE Policy is provided in Table 1.1 below. The policy may provide to the UE 610 the FQDN/IP address of the MNO AF 650 to contact for UE data reporting, data for authentication, the characteristics of the PDU session to use for a connection (reusing Route Selection Descriptors as defined for URSPs), and the information about the conditions to do the reporting. Therefore, only the UEs for which a UE Reporting Data Policy has been downloaded will establish a connection with the MNO AF 650. Alternatively, the characteristics of the PDU session to use for the connection to the MNO AF 650 can be downloaded to the UE 610 in a different URSP including the MNO AF address as traffic descriptor. In the context of this example, the connection between the UEs and the MNO AF 650 can be regarded as an example of an association between UEs and an AF as described with reference to the embodiments as illustrated in FIG. 2 and FIG. 4.

TABLE 1.1

An exemplary structure of the UE Reporting Data Policy

| Information name | Description |
| --- | --- |
| MNO AF address | Indicates the FQDN/IP address of the MNO AF to contact for UE reporting. |
| Unique Identifier | A short lived, hard to re-create or verifiable, identifier (e.g. Token) that enables the MNO AF to verify that the sender of data is the correct entity in the UE (e.g. not a malicious application). This may be a one-time valid identifier instead. For the UEs that are not registered yet, the PCF can download the UE policy once the UE has registered to the network (e.g. after one day). |
| List of Route Selection Descriptors | A list of Route Selection Descriptors. The components of a Route Selection Descriptor will be described in Table 1.2 This part can be reused from URSPs. |
| Conditions to report | Additional to time and location criteria included as part of a RSD, the UE Reporting Data Policy may include conditions about the minimum battery level threshold in the UE and/ or radio conditions for data reporting (e.g. avoid data reporting if there is a low coverage for the uplink). |
| UE-Requested-Data-ID | Indicates the UE requested data (related to collection of UE data other than Application Layer data). This may be optional in some embodiments, since at least in some embodiments the UE-Requested-Data-ID may be requested to be sent to the UE after the user plane connection between the UE and the MNO AF has been established (see step 18). |

TABLE 1.2

An exemplary structure of the Route Selection Descriptor

| Information name | Description | Category |
| --- | --- | --- |
| Route Selection Descriptor Precedence | Determines the order in which the Route Selection Descriptors are to be applied. | Mandatory |
| Route selection components | This part defines the route selection components. | Mandatory |
| SSC Mode Selection | One single value of SSC mode. | Optional |
| Network Slice Selection | Either a single value or a list of values of S-NSSAI(s). | Optional |
| DNN Selection | Either a single value or a list of values of DNN(s). | Optional |
| PDU Session Type Selection | One single value of PDU Session Type. | Optional |
| Non-Seamless Offload indication | Indicates if the traffic of the matching application is to be offloaded to non-3GPP access outside of a PDU Session. | Optional |
| Access Type preference | Indicates the preferred Access Type (3GPP or non-3GPP or Multi-Access) when the UE establishes a PDU Session for the matching application. | Optional |
| Route Selection Validation Criteria | This part defines the Route Validation Criteria components. | Optional |
| Time Window | The time window when the matching traffic is allowed. The RSD is not considered to be valid if the current time is not in the time window. | Optional |
| Location Criteria | The UE location where the matching traffic is allowed. The RSD rule is not considered to be valid if the UE location does not match the location criteria. | Optional |

In steps 15 and 16 as shown in FIGS. 6B and 6C, the UE 610 can establish a connection with the MNO AF 650 according to the UE Reporting Data Policy, by establishing a new PDU session or reusing an existing one matching the characteristics in the UE policy. In this example a HTTPS connection and the UE-ID are used. Furthermore, the UE can announce what UE data (identified by UE-Requested-Data-ID or a specific identifier for the UE-MNO AF interaction) (Application Layer and other layers) it can provide in this procedure.

In steps 17 and 18 as shown in FIG. 6C, if specific UE data is not already provided in the UE Reporting Data Policy (at Step 12), the MNO AF 650 may request this specific UE data (by indicating the UE-Requested-Data-ID) and may also indicate additional reporting information (e.g. periodic reporting, or event-based reporting). The reporting information (period of reporting, event based, etc.) will be influenced by eventsRepInfo provided by the NWDAF 670 when subscribing to Naf_EventExposure but also by factors such as battery and bitrate consumption. Furthermore, the MNO AF 650 can request sampling rates that are higher than reporting rates, i.e. the UE will transfer a set of measurements with each transfer.

In steps 19 and 20 as shown in FIGS. 6C and 6D, the UE 610 may perform data collection for the specific UE-Requested-Data-ID. In this example, every X second(s), or whenever a certain event has occurred, the UE 610 may trigger a report towards the MNO AF 650, which may include the requested UE data (identified by UE-Requested-Data-ID) through the user plane connection.

In steps 21 and 22 as shown in FIG. 6D, the MNO AF 650 may use the data obtained from the UE in combination with other data and then provide the result to the NWDAF 670 as Event Data by triggering a Naf_EventExposure_Notify towards the NWDAF 670, which can include at least one of: Event-ID (which indicates the target event related to collection of UE data other than Application Layer data), UE-ID (which indicates the target UE, e.g. in the form of a SUPI), Event Data (which includes the UE Environmental data or UE Application Later data or any other UE data). In these steps, the MNO AF 650 for UE data collection can also provide the NWDAF 670 with aggregated data (from the target UEs).

Subsequently, in step 23 as shown in FIG. 6D the NWDAF 670 may produce analytics based on the UE collected data, and in step 24 the NWDAF 670 may provide the analytic result to the consumer NF 680 by triggering a Nnwdaf_AnalyticsSubscription_Notify message, which can include at least one of the following parameters: Analytic-ID (which indicates the analytic requested), UE-ID (which indicates the target UE), and Analytic result (which indicates the analytic output).

Figure 7A:
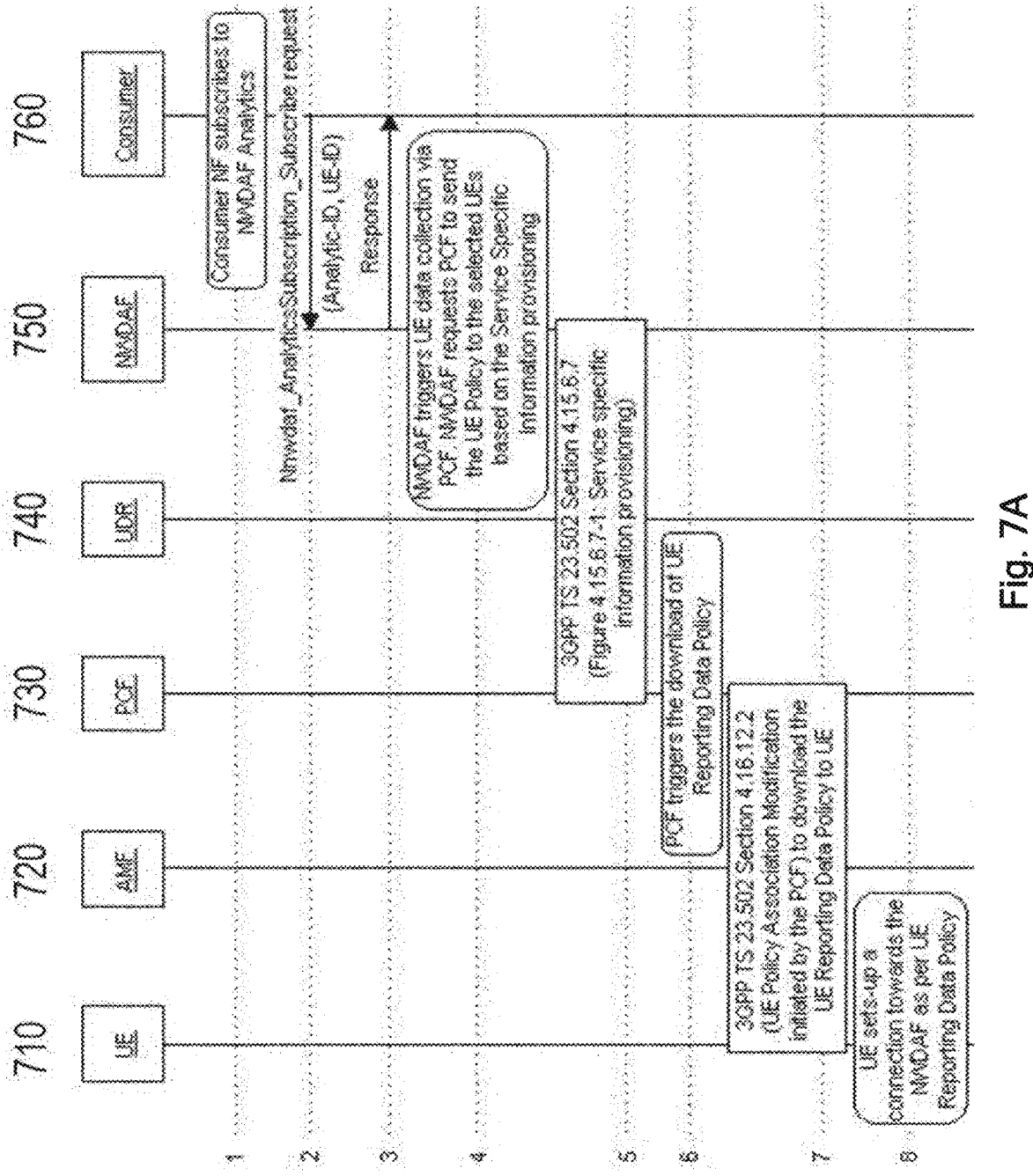
FIGS. 7A and 7B illustrates, in a sequence diagram, an example of a data collection procedure according to an embodiment of the present disclosure.
Figure 7B:
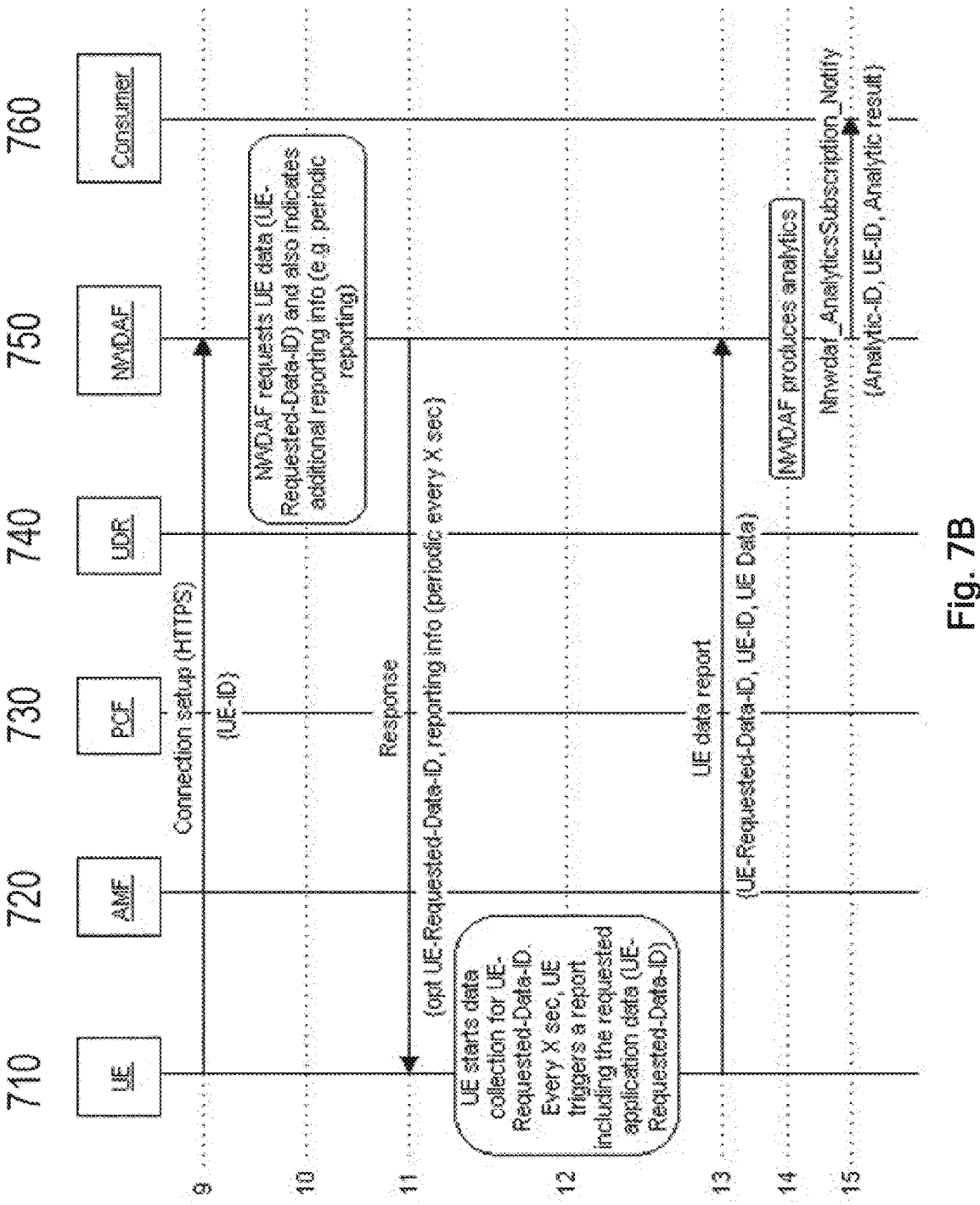

Some of the steps described above can be used to increase the control of collection of Application Layer data in 3GPP 23.700-91 Sol #27. For example, steps 11 and 12 as described above "MNO AF requests PCF to send the UE Reporting Data Policy to the selected UEs" and steps 13 and 14 as described above "PCF triggers the download of (new) UE Reporting Data Policy" (in this case, the UE Reporting Data Policy can also contain information about the Application ID in this case). An API for control of the ASP Application Client data collection and sending of the data to the MNO AF can be introduced in the UE. FIGS. 7A and 7B illustrate, in a sequence diagram, an example of a data collection procedure according to an embodiment of the present disclosure. In this example, it is assumed that the UE's Policy associations are already established.

In steps 1 and 2 as shown in FIG. 7A, a Consumer NF 760 may subscribe to NWDAF Analytics and triggers a Nnwdaf_AnalyticsSubsciption_Subscribe request message, which can include at least one of the following parameters: Analytic-ID (which indicates the analytic requested) and UE-ID (which indicates the target UE). In this example, only one UE 610 is involved, but it will be appreciated that more than one UEs can be involved in other embodiments.

In step 3 as shown in FIG. 7A, the NWDAF acknowledges the request from step 2. Then, in steps 4 and 5, the NWDAF 750 may trigger UE data collection via the PCF 730. The NWDAF 750 may determine what UEs (given location area or SUPI group or SUPI list) that should collect data. Then, the NWDAF 750 may request the PCF 730 to indicate the UE 710 to connect to the NWDAF 750 (through HTTPS). For this operation, the existing solution in 3GPP TS 23.502 Section 4.15.6.7 (Figure 4.15.6.7-1: Service specific information provisioning) can be used, so the NWDAF 750 can request the PCF 730 to download the UE Policy to the selected UEs based on the Service Specific Information provisioning from an AF (not shown in the drawing). In the context of this example, the connection between the UEs and the NWDAF 750 can be regarded as an example of an association between UEs and the NWDAF as described with reference to the embodiments illustrated in FIG. 3 and FIG. 5.

In steps 4 and 5 as shown in FIG. 7A, the NWDAF 750 can store a request in UDR 740 (directly without using NEF), which in turn triggers a Nudr notification to the subscribed PCFs 730, which can then trigger the sending of UE Policy for affected UE Policy associations. Alternatively, the NWDAF 750 can discover the PCF instance handling the UE Policy association and directly request the PCF 730 to send the UE Policy to the selected UEs.

In steps 6 and 7 as shown in FIG. 7, the PCF 730 may trigger the download of (new) UE Reporting Data Policy which is sent as a UE policy through the AMF 720 following the standard procedure for UE policy update described in 3GPP TS 23.502 section 4.16.12.2. The structure of the new UE Policy for this example is similar to that described in the Table 1.1 as provided above with reference to the method illustrated in FIGS. 6A-6D, except that instead of including "MNO AF address", the UE Policy for this example includes the "NWDAF address". Specifically, the policy may provide to the UE 710 the FQDN/IP address of the NWDAF 750 to contact for UE data reporting, the characteristics of the PDU session to use for that connection (reusing Route Selection Descriptors as defined for URSPs), and the information about the conditions to do the reporting.

Therefore, only the UEs for which a UE Reporting Data Policy has been downloaded will establish a connection with the NWDAF 750. Alternatively, the characteristics of the PDU session to use for the connection with the NWDAF 750 can be downloaded to the UE 710 in a different URSP including the NWDAF address as traffic descriptor.

In steps 8 and 9 as shown in FIGS. 7A and 7B, the UE 710 may set up a connection with the NWDAF 750 according to the UE Reporting Data Policy, by establishing a new PDU session or reusing an existing one matching the characteristics in the UE policy. In this example a HTTPS connection and the UE-ID are used. In embodiments where the policy indicates to set up a separate PDU session, a separate PDU session will be requested by the UE 710 to carry UE data.

In steps 10 and 11 as shown in FIG. 7B, if specific UE data is not already provided in the UE Reporting Data Policy (at step 7), the NWDAF 750 may request this specific UE data (by indicating the Event-ID) and may also indicate additional reporting info (e.g. periodic reporting).

In steps 13 and 14 as shown in FIG. 7B, the UE 710 may start data collection for the specific Event-ID. In this example, every X sec, the UE 710 may trigger a report towards the NWDAF 750, which may include the requested application data (Event-ID) through the user plane connection (e.g. over a separate PDU session).

In step 17 as shown in FIG. 7, the NWDAF 750 may produce analytics based on the UE collected data, and in step 18, the NWDAF 750 may provide the analytic result to the consumer NF 760 by triggering a Nnwdaf_AnalyticsSubscription_Notify message, which may include at least one of the following parameters: Analytic-ID (which indicates the analytic requested), UE-ID (which indicates the target UE), and Analytic result (which indicates the analytic output).

Embodiments of the disclosure thus introduce improved methods, systems, and apparatuses for collecting UE data in an efficient manner.

There is also provided a computer program product comprising a computer readable medium, the computer readable medium having computer readable code embodied therein, the computer readable code being configured such that, on execution by a suitable computer or processor, the computer or processor is caused to perform the method or methods described herein. Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The above disclosure sets forth specific details, such as particular embodiments or examples for purposes of explanation and not limitation. It will be appreciated by one skilled in the art that other examples may be employed apart from these specific details.

Abbreviations

| Abbreviation | Explanation |
| --- | --- |
| AF | Application Function |
| AMF | Access and Mobility Function |
| AS | Application Server |
| ASP | Application Service Provider |
| BSF | Binding Session Function |
| CP | Control Plane |
| DL | Downlink |
| DN | Data Network |
| DNN | Data Network Name |
| DNS | Domain Name Security |
| E2E | End-to-End |
| FQDN | Fully Qualified Domain Name |
| HTTP | Hypertext Transport Protocol |
| HTTPS | Hypertext Transport Protocol Secure |
| IE | Information Element |
| JWT | JSON Web Toke |
| JSON | JavaScript Object Notation |
| MNO | Mobile Network Operator |
| NEF | Network Exposure Function |
| NWDAF | Network Data Analytics Function |
| PCRF | Policy and Charging Rule Function |
| PDN | Packet Data Network |
| PDU | Protocol Data Unit |
| PGW | Packet Gateway |
| Qos | Quality of Service |
| RAN | Radio Access Network |
| RSRP | Reference Signal/s Received Power |
| RSRQ | Reference Signal/s Received Quality |
| SCEF | Service Capability Exposure Function |
| SMF | Session Management Function |
| SUPI | Subscription Permanent Identifier |
| TLS | Transport Layer Security |
| UE | User Equipment |
| UL | Uplink |
| UP | User Plane |
| UPF | User Plane Function |
| URL | Universal Resource Locator |

The invention claimed is:

1. A method for collecting user equipment (UE) data, the method comprising:

receiving, at a network data analytics function (NWDAF), a request for data analytics;

performing, at the NWDAF, discovery of an application function (AF) for data collection, wherein the discovery of the AF is based on the received request;

subscribing to the AF for data collection at the NWDAF;

determining, by the AF for data collection, one or more target UEs for data collection;

performing discovery of a policy control function (PCF) by the AF for data collection;

storing the request for data analytics in a User Data Repository (UDR) to trigger a notification to the PCF;

sending a policy from the PCF to the one or more target UEs, wherein sending the policy from the PCF is triggered by the storage of the request for data analytics in the UDR;

establishing an association between at least one of the one or more target UEs and the AF for data collection;

instructing the one or more target UEs to collect data and to send the collected data to the AF; and sending the collected data from the AF to the NWDAF.

2. The method according to claim 1, wherein sending the policy from the PCF to the one or more target UEs is requested by the AF based on a Service Specific Information provisioning from the AF.

3. The method according to claim 1, further comprising providing, by the NWDAF to the AF, at least one of: a location criterion, a subscription permanent identifier (SUPI) group, or a SUPI list, and wherein determining one or more target UEs for data collection by the AF is based on the received at least one of: a location criterion, a SUPI group, or a SUPI list.

4. The method according to claim 1, further comprising registering the AF in a Network Repository Function (NRF) by triggering a message including an indication of a network function (NF) type and a list of Event identifiers, wherein an Event identifier indicates a supported event related to the collection of UE data.

5. The method according to claim 4, further comprising, upon registration of the AF in the NRF, providing an address of the AF to the NWDAF.

6. The method according to claim 1, wherein subscribing to the AF for data collection comprises sending a subscription request message to the AF for data collection, wherein the subscription request message comprises: an Event identifier and a UE identifier, wherein the Event identifier indicates a supported event related to the collection of UE data and the UE identifier indicates one or more target UEs.

7. The method according to claim 1, wherein the policy includes at least one of: an address of the AF, Protocol Data Unit (PDU) session characteristics to use for data reporting, or one or more conditions for data reporting.

8. The method according to claim 1, further comprising: producing, at the NWDAF, analytics based on the collected data; and sending the analytics to a consumer Network Function (NF).

9. A method for collecting user equipment (UE) data, the method comprising:
    receiving, at a network data analytics function (NWDAF), a request for data analytics;
    determining, by the NWDAF, one or more target UEs for data collection, wherein the determination of the one or more target UEs is based on the received request;
    performing discovery of a policy control function (PCF) by the NWDAF;
    storing the request for data analytics in a User Data Repository (UDR) to trigger a notification to the PCF;
    sending a policy from the PCF to the one or more target UEs, wherein sending the policy from the PCF is triggered by the storage of the request for data analytics in the UDR;
    establishing an association between at least one of the one or more target UEs and the NWDAF; and
    instructing the one or more target UEs to collect data and to send the collected data to the NWDAF.

10. The method according to claim 9, wherein sending the policy from the PCF to the one or more target UEs is requested by the NWDAF based on a Service Specific Information provisioning from an application function (AF).

11. The method according to claim 9, wherein determining one or more target UEs for data collection by the NWDAF is based on at least one of: a location criterion, a Subscription Permanent Identifier (SUPI) group, or a SUPI list.

12. The method according to claim 9, wherein the policy includes at least one of: an address of the NWDAF, Protocol Data Unit (PDU) session characteristics to use for data reporting, or one or more conditions for data reporting.

13. The method according to claim 9, further comprising requesting, by the NWDAF, specific UE data by indicating an Event identifier and additional reporting information, wherein instructing the one or more target UEs to collect data and to send the collected data to the NWDAF is based on the request for specific UE data.

14. The method according to claim 9, further comprising:
    producing, at the NWDAF, analytics based on the collected data; and sending the analytics to a consumer Network Function (NF).

15. An apparatus comprising a processor coupled with a memory, wherein the apparatus is configured to:
    receive, at a network data analytics function (NWDAF), a request for data analytics:
    perform discovery of an application function (AF) for data collection, wherein the discovery of the AF is based on the received request;
    subscribe to the AF for data collection at the NWDAF;
    determine, by the AF for data collection, one or more target UEs for data collection;
    perform discovery of a policy control function (PCF) by the AF for data collection;
    store the request for data analytics in a User Data Repository (UDR) to trigger a notification to the PCF;
    send a policy from the PCF to the one or more target UEs, wherein sending the policy from the PCF is triggered by the storage of the request for data analytics in the UDR;
    establish an association between at least one of the one or more target UEs and the AF for data collection;
    instruct the one or more target UEs to collect data and to send the collected data to the AF; and
    send the collected data from the AF to the NWDAF.

16. An apparatus comprising a processor coupled with a memory, wherein the apparatus is configured to:
    receive, at a network data analytics function (NWDAF), a request for data analytics;
    determine, by the NWDAF, one or more target UEs for data collection;
    perform discovery of a policy control function (PCF) by the NWDAF;
    store the request for data analytics in a User Data Repository (UDR) to trigger a notification to the PCF;
    send a policy from the PCF to the one or more target UEs, wherein sending the policy from the PCF is triggered by the storage of the request for data analytics in the UDR;
    establish an association between at least one of the one or more target UEs and the NWDAF; and
    instruct the one or more target UEs to collect data and to send the collected data to the NWDAF.

* * * * *